United States Patent [19]

Punches et al.

[11] Patent Number: 4,878,356

[45] Date of Patent: Nov. 7, 1989

[54] STORAGE TANK SCALE FOR A REFRIGERANT RECOVERY SYSTEM

[75] Inventors: Robert J. Punches, Hamler; Gary P. Murray, Montpelier; Roger D. Shirley, West Unity, all of Ohio

[73] Assignee: Kent-Moore Corporation, Warren, Mich.

[21] Appl. No.: 263,887

[22] Filed: Oct. 28, 1988

[51] Int. Cl.[4] .............................................. F25B 45/00
[52] U.S. Cl. ........................................ 62/149; 62/292; 177/116; 177/154; 177/229; 200/85 R
[58] Field of Search ................. 62/149, 292; 177/116, 177/154, 229; 141/83; 73/296; 200/83 S, 85 R

[56] References Cited

U.S. PATENT DOCUMENTS

| | | | |
|---|---|---|---|
| 2,289,882 | 7/1942 | Myers | 200/83 S X |
| 4,317,495 | 3/1982 | Kuhnle et al. | 177/229 X |
| 4,655,305 | 4/1987 | Jacobson | 177/229 X |
| 4,678,050 | 7/1987 | Wirth et al. | 177/229 |
| 4,768,347 | 9/1988 | Manz et al. | 62/292 X |
| 4,775,020 | 10/1988 | Nishiyama | 177/229 X |

*Primary Examiner*—William E. Tapolcai
*Attorney, Agent, or Firm*—Barnes, Kisselle, Raisch, Choate, Whittemore & Hulbert

[57] ABSTRACT

A refrigerant recovery system that includes a refrigerant storage container, means for withdrawing refrigerant from a refrigeration system to be serviced and feeding such refrigerant to the container for storage, and a scale supporting the container for sensing impending overfill of the container. The scale includes a beam horizontally rigidly cantilevered from a base. A switch is positioned adjacent to the cantilever-remote end of the beam, and is responsive to deflection of the beam to indicate impending overfill of the container and prevent or terminate operation of the refrigerant recovery system.

6 Claims, 1 Drawing Sheet

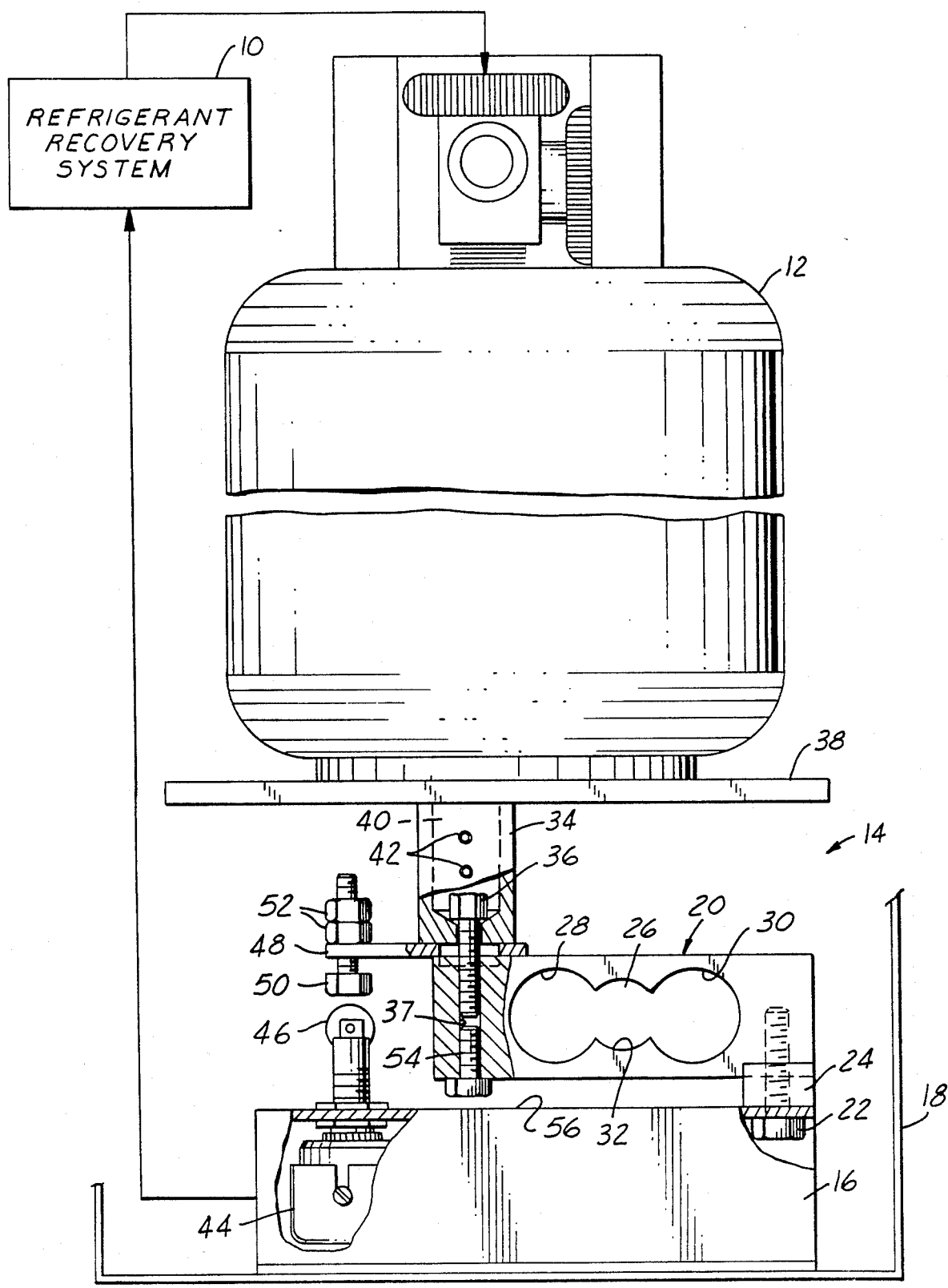

STORAGE TANK SCALE FOR A REFRIGERANT RECOVERY SYSTEM

The present invention is directed to a scale for indicating weight of articles supported thereby, and more particularly to a scale for indicating impending overfill of a refrigerant storage tank in a refrigerant recovery system.

BACKGROUND AND OBJECTS OF THE INVENTION

U.S. Pat. No. 4,768,347 discloses a refrigerant recovery system that includes a compressor having an input coupled through an evaporator and through a solenoid valve to a refrigeration system from which refrigerant is be withdrawn, and an output coupled through a condenser to a refrigerant storage container or tank. The evaporator and condenser are contained within a closed cylindrical canister for heat exchange and oil separation, the canister having an oil drain in the bottom. The refrigerant storage container is carried by a scale having a limit switch coupled to control electronics to prevent or terminate further refrigerant recovery in the event of impending overfill of the container. The scale in the noted patent comprises a platform pivotally mounted by a hinge pin to a support base. A pair of coil springs are captured in compression between the platform and the base adjacent to the pivot-remote edge thereof, and the the limit switch is mounted on the base adjacent to the coil springs.

Although the system disclosed in the noted patent has enjoyed substantial commercial acceptance and success, improvements remain desirable, particularly in connection with construction of the container scale. To be specific, it has been found that manual assembly of the pivot pin to the platform and base can be difficult and time consuming. Further, the coil springs can exhibit inconsistent spring rates, and can collapse during assembly or use, necessitating repair. Adjustment of the scale weight threshold cannot be implemented as readily as desirable.

A general object of the present invention is to provide a scale assembly that can be readily and economically manufactured, that exhibits consistent operating characteristics both from one scale to another and/over an extended useful life for each individual scale, and that is more reliable than spring-type scales of the prior art as described above.

Another and more specific object of the invention is to provide a scale assembly of the described character that produces an electrical output signal upon scale deflection corresponding to weight of a predetermined amount, and in which the deflection threshold and/or limit may be readily adjusted both in the factory and in the field.

A further object of the invention is to provide a refrigerant recovery system, of the type disclosed in the abovenoted patent, which includes an improved recovery tank scale that satisfies one or more of the foregoing objectives.

SUMMARY OF THE INVENTION

A scale assembly in accordance with a first important aspect of the present invention comprises a support base and a beam rigidly horizontally cantilevered from the support base. A platform adapted to support articles to be weighed is carried by the beam at an end remote from the cantilever coupling to the base. The beam in the preferred embodiment of the invention comprises an integral rectangular block having a longitudinal dimension extending generally horizontally with respect to the base. A cavity extends laterally through the beam centrally of the longitudinal dimension, such that deflection of the beam takes the form of flexure of web portions of the beam above and below the cavity.

A sensor is carried by the base adjacent to the support-remote end of the beam for indicating weight of articles on the platform as a function of deflection of the beam with respect to the base. In accordance with a presently preferred embodiment of the invention, the weight-indicating sensor is of a type for providing a electrical signal as a function of beam deflection, most preferably a limit switch having a switch actuator positioned to be engaged by a screw adjustably threadably received on an arm that extends over the switch actuator from the support-remote end of the beam. A second screw, in the preferred embodiment of the invention, is adjustably threadably received in the support-remote end of the beam overlying the support base to form a stop limiting deflection of the beam and thereby protecting the switch.

In accordance with a second aspect of the present invention, a refrigerant recovery system includes a refrigerant storage container or tank, refrigeration circuitry for withdrawing refrigerant from a refrigeration system and feeding such refrigerant to the storage container, and a scale of the above-described character supporting the container for sensing impending overfill of the container. Most preferably, the scale sensor switch directs its electrical signal to the refrigerant recovery system to terminate operation thereof in the event of an impending overfill of the container.

BRIEF DESCRIPTION OF THE DRAWING

The invention, together with additional objects, features and advantages thereof, will be best understood from the following description, the appended claims and the accompanying DRAWING, which is a fragmentary partially sectioned and partially schematic view of a refrigerant recovery system having a recovery tank scale in accordance with a presently preferred embodiment of the invention.

DETAILED DESCRIPTION OF PREFERRED EMBODIMENT

The DRAWING illustrates a refrigerant recovery system 10, which most preferably takes the form of a system as disclosed in U.S. Pat. No. 4,768,347 issued Sept. 6, 1988 and assigned to the assignee hereof, the disclosure of which is incorporated herein by reference. Refrigerant recovery system 10 is thus adapted to withdraw refrigerant from a refrigeration system to be serviced, and to direct such refrigerant to a liquid storage tank or container 12. Container 12 rests on a scale 14 that includes a support base 16 carried on a frame 18, which may form part of a wheeled cart as disclosed in the referenced patent. A beam 20 is cantilevered at one end from base 16 by means of a screw 22 extending upwardly from within base 16 through a spacer 24 and into the end of beam 20. Beam 20 preferably comprises an integral substantially rectangular block of rigid construction, such as metal, having a longitudinal dimension or axis cantilevered generally horizontally over base 16. A cavity 26, in the form of a spaced pair of large cylindrical openings 28, 30 interconnected by a smaller cylindrical opening 32, extends entirely through beam 20 laterally and centrally of the horizontal longitudinal dimension thereof.

A collar 34 is fastened to the upper surface of beam 20, at the cantilever-remote end thereof, by means of a screw 36 extending from within collar 34 into a corresponding threaded opening 37 in beam 20. A flat circular platform 38 has a central boss 40 removably received within collar 34 and fastened therewithin by the set screws 42. A limit switch 44 is mounted within base 16 and has a switch actuator 46 extending upwardly therefrom adjacent to the cantilever-remote end of beam 20. An arm 48, in the form of a flat plate, is sandwiched between collar 34 and beam 20, and extends longitudinally therefrom over switch actuator 46. A screw 50 is mounted on arm 48 in superimposed alignment with actuator 46 of switch 44 and is adjustably positioned with respect thereto by the jam nuts 52. A second screw 54 is received in opening 37 from the lower surface of beam 20 and cooperates with the opposing surface 56 of base 16 to form a stop against downward deflection of beam 20.

In operation, beam 20 is deflected downwardly with respect to base 16 by weight of container 12 and any refrigerant contained therewithin. Such downward deflection of cantilevered beam 20 takes the form of flexure of the ensmalled web portions of the beam above and below cavity 26. When the beam deflects sufficiently to bring screw 50 into engagement with switch actuator 46, switch 44 indicates impending overfill of container 12 and prevents or terminates further operation of system 10 as disclosed in the referenced patent. Weight of container 12 and refrigerant contain therein necessary to so terminate operation is adjustable by means of screw 50 and nuts 52. Likewise, total downward deflection of beam 20 is adjustably limited by opposition of screw 54 and base surface 56, which protects switch 44 in the event of placement of very heavy objects on scale platform 38.

The subject scale may form part of the refrigerant recovery apparatus as in the above-noted patent, or be provided as a separate unit.

The invention claimed is:

1. A refrigerant recovery system that includes a refrigerant storage container, means for withdrawing refrigerant from a refrigeration system and feeding such refrigerant to said container for storage, a scale supporting said container for supplying an electrical signal to indicate impending overfill of said container, and means for directing said electrical signal to said refrigerant-withdrawing means to terminate operation of said refrigerant-withdrawing means when said scale indicates impending overfill of said container; characterized in that said scale comprises:

a support base, a rigid beam horizontally cantilevered from said base, means carried by said beam at an end thereof remote from said base and adapted to support said container such that weight of said container and of refrigerant contained therein deflects said beam end vertically downwardly, an electrical switch carried by said base beneath said base-remote end of said beam and having a switch actuator extending upwardly toward said base-remote end of said beam, means carried by said beam spaced from said actuator in the absence of deflection of said beam for engaging said switch actuator upon a set amount of deflection of said base-remote end of said beam toward said switch actuator, and means on said beam spaced from said support base in the absence of deflection of said beam forming a stop for abutting engagement between said beam and said base to limit deflection of said beam toward said switch actuator and thereby protect said switch and actuator from damage due to excessive weight on said base-remote end of said beam.

2. The system set forth in claim 1 wherein said stop-forming means includes means for adjustably positioning said stop-forming means so as to adjust said deflection limit of said beam.

3. The system set forth in claim 2 wherein said stop-forming means comprises means adjustably threadably received in a lower surface of said beam at said base-remote end thereof for engaging said base.

4. The system set forth in claim 3 wherein said actuator-engaging means comprises an arm cantilevered from said base-remote end of said beam, and means adjustably threadably received in said arm in superimposed position to said actuator for engaging said actuator upon deflection of said beam.

5. The system set forth in claim 4 wherein said beam is of rigid integral substantially rectangular construction, having a longitudinal dimension extending horizontally.

6. The system set forth in claim 5 wherein said beam further comprises means forming a cavity extending laterally through said beam centrally of said longitudinal dimension, such that deflection of said beam takes place as flexure of portions of said beam above and below said cavity.

* * * * *